US009824138B2

(12) United States Patent
Pehle

(10) Patent No.: US 9,824,138 B2
(45) Date of Patent: Nov. 21, 2017

(54) SYSTEMS AND METHODS FOR THREE-TERM SEMANTIC SEARCH

(75) Inventor: Todd Pehle, Annapolis, MD (US)

(73) Assignee: Orbis Technologies, Inc., Annapolis, MD (US)

( * ) Notice: Subject to any disclaimer, the term of this patent is extended or adjusted under 35 U.S.C. 154(b) by 0 days.

(21) Appl. No.: 13/071,949

(22) Filed: Mar. 25, 2011

(65) Prior Publication Data

US 2012/0246153 A1    Sep. 27, 2012

(51) Int. Cl.
G06F 7/00     (2006.01)
G06F 17/30    (2006.01)

(52) U.S. Cl.
CPC .... G06F 17/3064 (2013.01); G06F 17/30864 (2013.01)

(58) Field of Classification Search
None
See application file for complete search history.

(56) References Cited

U.S. PATENT DOCUMENTS

| | | | |
|---|---|---|---|
| 6,727,927 B1 | 4/2004 | Dempski et al. | |
| 6,820,075 B2 | 11/2004 | Shanahan et al. | |
| 7,730,053 B2 * | 6/2010 | Sauermann | G06F 17/30469 707/713 |
| 8,674,993 B1 * | 3/2014 | Fleming | G06Q 40/06 707/794 |
| 2002/0087408 A1 * | 7/2002 | Burnett | 705/14 |
| 2003/0028564 A1 | 2/2003 | Sanfilippo | |
| 2006/0036593 A1 * | 2/2006 | Dean et al. | 707/4 |
| 2006/0129531 A1 * | 6/2006 | Bates | 707/3 |
| 2006/0271526 A1 | 11/2006 | Charnock et al. | |
| 2007/0128899 A1 | 6/2007 | Mayer | |
| 2008/0177994 A1 | 7/2008 | Mayer | |
| 2009/0070326 A1 * | 3/2009 | Kraft | 707/5 |
| 2009/0089277 A1 | 4/2009 | Cheslow | |
| 2010/0050131 A1 | 2/2010 | Weise et al. | |
| 2010/0082634 A1 | 4/2010 | Leban | |
| 2010/0138436 A1 * | 6/2010 | Gupta | G06Q 30/00 707/759 |
| 2010/0191748 A1 | 7/2010 | Martin et al. | |
| 2010/0235353 A1 | 9/2010 | Warnock et al. | |
| 2010/0250578 A1 * | 9/2010 | Athsani et al. | 707/765 |
| 2011/0087686 A1 * | 4/2011 | Brewer et al. | 707/766 |

* cited by examiner

Primary Examiner — Jau-Shya Meng
(74) Attorney, Agent, or Firm — Edell, Shapiro & Finnan, LLC

(57) ABSTRACT

Methods and systems for searching over a large corpus of data to discover relevant information artifacts based on similar content and/or relationships are disclosed. Improvements over simple keyword and phrase based searching over Internet scale data are shown. A search query may be modified or relaxed based on the search terms and a contextual relationship therebetween. The search results may be ranked based on both a data ranking corresponding to the data entries in the corpus and a query ranking corresponding to the search query and/or the modified or relaxed search query. In this manner, the accuracy and relevance of the search results is improved.

19 Claims, 6 Drawing Sheets

SYSTEMS AND METHODS FOR THREE-TERM SEMANTIC SEARCH

BACKGROUND OF THE INVENTION

Field of the Invention

The present invention relates to systems and methods for searching a large corpus of electronically-stored data to identify contextually relevant search results and for improving the accuracy of the search results by modifying the search query.

Description of the Related Art

There has been much research on search and retrieval of electronically-stored documents. Typically, searching requires knowledge of a specific term or set of terms contained in the documents. Similarity-based document retrieval allows the user to fetch "more documents like this one" by using a general document-similarity score as measured by counting words without regard to context. In addition, many information retrieval and folksonomic techniques, such as keyword search and data tagging, offer a simple interface but lack expressive search capabilities.

Conventional computer database applications may offer powerful search capability, but often use complicated, difficult-to-use interfaces, and are inherently brittle because they are tied to the underlying database schema. Conventional Natural Language Processing (NLP)-based systems may offer a simple interface and potential for expressive search capability, but there are often semantic mismatches between the user input and the machine interpretations of the query request.

Accordingly, such search techniques may produce too many false positives and miss too many relevant documents; or, such search techniques may miss relevant documents because the literal terms of the search query are too rigidly applied to the documents in the corpus, thereby failing to identify documents that use terms closely related to those originally provided in the search query.

SUMMARY OF THE INVENTION

Methods and systems for improving the accuracy of search results across enterprise and web-scale information systems while maintaining web-scale performance and a user-friendly user interface are disclosed. The disclosed methods and systems provide an ability to search over a large corpus of data to discover relevant information artifacts based on similar content and/or relationships. Improvements over keyword and phrase based searching over Internet scale data are shown. Search engines providing accurate and contextually relevant search results are disclosed. Search queries are adjusted based on contextual relationships indicated by the original search terms. Results are ranked based on both the document content and the search query.

In one aspect, the invention includes a method for searching through a corpus of items by using a query. The method includes the steps of: receiving a first query input from a user; using the received first query input to determine a first search term corresponding to a subject of the query; receiving a second query input from the user; using the received second query input to determine a second search term corresponding to an object of the query; receiving a third query input from the user; using the received third query input to determine a third search term corresponding to a predicate of the query; using the first, second, and third search terms to determine a contextual relationship therebetween; and using the query formed by the first, second, and third search terms and the determined contextual relationship to perform a first comparison against the corpus to determine a ranked list of results.

The determination of a contextual relationship may include determining a graphical depiction of the query formed by the first, second, and third search terms. The graphical depiction may be based on at least one parameter relating to the determined contextual relationship. The determination of a ranked list of results may be based on a measure relating to the at least one parameter. The method may further include the steps of modifying the query with respect to the at least one parameter and using the modified query to determined a modified ranked list of results.

The step of using the query and the determined contextual relationship to perform a first comparison against the corpus may include determining a data ranking score for each item contained in the corpus. The method may further include the steps of using the query to determine a query ranking score and using the query ranking score and the data ranking score to determine a knowledge ranking score. The determination of a ranked list of results may be based on the knowledge ranking score.

The method may further include the steps of: providing at least one suggested alternative search term to at least one of the first, second, and third search terms; receiving an acceptance of the at least one suggested alternative search term; using the accepted alternative search term to determine a modified contextual relationship between the search terms and to form a modified query; and using the modified query and the modified contextual relationship to perform a second comparison against the corpus to determine a modified list of results.

In another aspect, the invention provides a system for searching through a corpus of items by using a query. The system comprises a server node and a user interface node in communication with the server node. When a user submits a first query input to the user interface node, the user interface node is configured to transmit the first query input to the server node. The server node is configured to: use the received first query input to determine a first search term corresponding to a subject of the query and to prompt the user for entry of a second query input; use the received second query input to determine a second search term corresponding to an object of the query and to prompt the user for entry of a third query input; use the received third query input to determine a third search term corresponding to a predicate of the query; use the first, second, and third search terms to determine a contextual relationship therebetween; and use the query formed by the first, second, and third search terms and the determined contextual relationship to perform a first comparison against the corpus to determine a ranked list of results.

The server node may be further configured to determine a graphical depiction of the query formed by the first, second, and third search terms. The graphical depiction may be based on at least one parameter relating to the determined contextual relationship. The server node may be further configured to determine the ranked list of results based on a measure relating to the at least one parameter. The server node may be further configured to modify the query with respect to the at least one parameter and to use the modified query to determined a modified ranked list of results.

The server node may be further configured to use the query and the determined contextual relationship to determine a data ranking score for each item contained in the corpus. The server node may be further configured to: use the query to determine a query ranking score; use the query ranking score and the data ranking score to determine a knowledge ranking score; and use the knowledge ranking score to determine the ranked list of results.

The server node may be further configured to: determine at least one suggested alternative search term to at least one of the first, second, and third search terms; transmit the at least one suggested alternative search term to the user interface node; receive an acceptance of the at least one suggested alternative search term from the user interface node; use the accepted alternative search term to determine a modified contextual relationship between the search terms and to form a modified query; and use the modified query and the modified contextual relationship to perform a second comparison against the corpus to determine a modified list of results.

In yet another aspect, the present invention provides a computer program product for searching through a corpus of items by using a query. The computer program product comprises a computer readable medium storing computer readable program code. The computer readable program code comprises: a set of instructions for receiving a first query input from a user; a set of instructions for using the received first query input to determine a first search term corresponding to a subject of the query; a set of instructions for receiving a second search term from the user; a set of instructions for using the received second query input to determine a second search term corresponding to an object of the query; a set of instructions for receiving a third query input from the user; a set of instructions for using the received third query input to determine a third search term corresponding to a predicate of the query; a set of instructions for using the first, second, and third search terms to determine a contextual relationship therebetween; and a set of instructions for using the query formed by first, second, and third search terms and the determined contextual relationship to perform a first comparison against the corpus to determine a ranked list of results.

The computer readable program code may further include a set of instructions for determining a graphical depiction of the query formed by the first, second, and third search terms. The graphical depiction may be based on at least one parameter relating to the determined contextual relationship. The computer readable program code may further include a set of instructions for determining the ranked list of results based on a measure relating to the at least one parameter. The computer readable program code may further include a set of instructions for modifying the query with respect to the at least one parameter, and a set of instructions for using the modified query to determined a modified ranked list of results.

The computer readable program code may further include a set of instructions for using the query and the determined contextual relationship to determine a data ranking score for each item contained in the corpus. The computer readable program code may further include: a set of instructions for using the query to determine a query ranking score; a set of instructions for using the query ranking score and the data ranking score to determine a knowledge ranking score; and a set of instructions for determining the ranked list of results based on the knowledge ranking score.

The computer readable program code may further include: a set of instructions for providing at least one suggested alternative search term to at least one of the first, second, and third search terms; a set of instructions for receiving an acceptance of the at least one suggested alternative search term; a set of instructions for using the accepted alternative search term to determine a modified contextual relationship between the search terms and to form a modified query; and a set of instructions for using the modified query and the modified contextual relationship to perform a second comparison against the corpus to determine a modified list of results.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION OF THE INVENTION

The present invention unifies aspects of information retrieval, structured search, and Natural Language Processing (NLP) into a single, simple user search tool. In a preferred embodiment, the system allows a user to type a few simple inputs which have semantic meaning in one or more underlying graph-based datasets. The user interface auto-guides the user through selection of conceptual search terms that match underlying graph data, thereby bypassing much of the need for natural language query processing. The query processor subsystem then parses the query into an optimized expressive graph query plan. This semi-structured query approach greatly improves search accuracy by enabling the user to build an expressive query that is well understood by the machine. The query processor relaxes the final query, so that if the processor cannot recognize all of the search terms, it will degrade gracefully into less expressive but potentially useful query results. If semantics cannot be understood in the search terms, the processor performs a keyword search and seeks matches to semantic pairs (i.e., two related entities in an artifact). In all cases, ranked results are returned to the user. Furthermore, query complexity is limited to simple, common-sense graph queries which are capable of being executed at web-scale. In this manner, the system bridges the gap between simple, web-scale, inexpressive keyword search and complex, enterprise-scale, expressive structured search. The processing components combine a variety of search techniques, including Resource Description Framework (RDF) bases, Boolean, semantic pairs, and others, in order to provide the foundation for true natural language queries over an Internet-scale data corpus.

Figure 1:
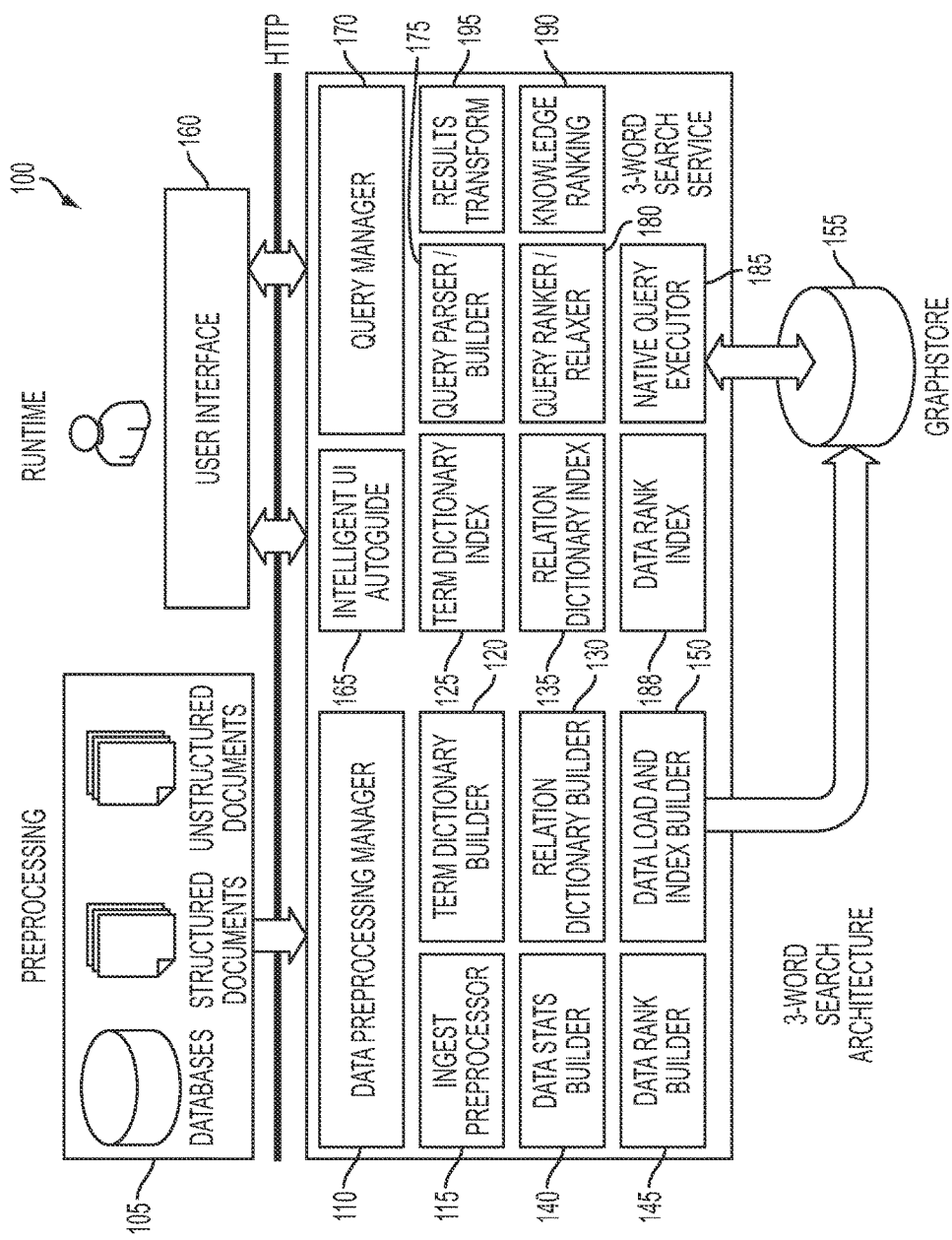
FIG. 1 illustrates a system architecture according to a preferred embodiment of the invention.

Referring to FIG. 1, an architectural diagram of a system 100 for performing a three-term search according to a preferred embodiment of the present invention is illustrated.

The system is configured to perform a preprocessing process and a runtime process. The preprocessing process includes the following tasks: ingesting structured, semi-structured, and unstructured data from a corpus 105 (e.g., via the Internet, an Intranet, or a database); performing inferences; calculating statistics; building indexes; and loading data into the graph-based repository. In the runtime process, the user uses an intelligent auto-guided query builder to build a search request. The runtime process includes parsing the user's search string, building the query, and relaxing and ranking the possible queries. The system then executes the query against the graph store. Using both data ranking and query ranking, the knowledge rank determines how best to interleave the results and then returns the results to the user.

In an exemplary embodiment, the system is implemented as a server node which can be a standard computer programmed to execute specific software modules that execute the processes described herein. The server node may be configured to communicate electronically with the corpus and user interface nodes, e.g., via standard network and communication protocols such as Transmission Control Protocol/Internet Protocol (TCP/IP) and Hypertext Transfer Protocol (HTTP). The user interface may be a standard computer that accesses processes on the server node by using a browser or proprietary software loaded on the computer. In an alternative embodiment, the preprocessing process and the runtime process and the user interface processes may be executed on a single computer. In an exemplary embodiment, the corpus includes a set of documents and/or other data items that are used to populate an electronically stored document/artifact data store or database.

The preprocessing process is coordinated by a Data Preprocessing Manager module 110. An Ingest Preprocessor module 115 performs extracting, transforming and inferencing over source data into an appropriate graph-based model representation. In one preferred embodiment, a directed acyclic graph (DAG) model is used. Once the source data has been rendered into a graph-based data format, the Term Dictionary Builder module 120 traverses the data by calculating different terms encountered in the data. The terms may include graph node identifiers (e.g., URIs in the RDF graph model); graph arc identifiers (e.g., properties in RDF); string literals and datatypes (e.g., names, descriptions, numbers, dates, etc.); and semantic class types (e.g., IBM has the semantic class type "business," John has the semantic class type "person," etc.). In addition, the Term Dictionary Builder module 120 builds a quick-access lookup index 125 containing each of the terms sorted lexicographically and based on term frequency count.

The Relationship Dictionary Builder module 130 also traverses the data by calculating the different pairs of literal-arc and arc-literal combinations encountered in the data, and building an index 135 containing the results of these calculations. For example, in the statement "John knows Mary," the index 135 would include the pair "John, knows" and the pair "knows, Mary." The index 135 would also include "Person, knows" and "knows, Person" if the entities John and Mary are both of semantic class type "person." By using the index 135, the auto-guiding intelligent user interface can quickly perform dictionary lookups based on knowledge gleaned from the incoming data. In this manner, the user interface "guides" the user to ask questions the system can answer.

The Data Statistics Builder module 140 traverses the graph data and calculates the skewing and distribution of terms and relationships in the data. These statistics are used by the Query Relaxer module to relax the query constraints. These statistics are also used by Knowledge Ranking module in determining the ordering of results.

The Data Rank Builder module 145 also uses the statistics provided by the Data Statistics Builder module 140 to calculate a number of potential ranking algorithms for graph nodes in the data. For example, simple term frequency—inverse document frequency (TF-IDF) counts or cardinality counts of incoming graph links and outgoing graph links can be computed. However, domain-specific algorithms may also be applied in order to rank certain nodes or data attributes higher than others. The Data Load and Index Builder module 150 performs index creation and loading of the data into the graph store 155 by utilizing conventional index and database load techniques.

The runtime process begins with the user initiating a search request via the user interface 160. The user interface 160 interacts with the Intelligent User Interface AutoGuide module 165 to build a search request as described further below. Once the search request is submitted from the user interface, the Query Manager module 170 receives the search request. The request includes at least the following information: 1) a search string; 2) semantic information relating to tokens determined from the search string; 3) a result set limit and/or offset request; and 4) format of results.

The Query Manager module 170 passes the search request to the Query Parser/Query Builder module 175, which performs a syntactic parsing of the search string into an optimized graph pattern query. If semantic information relating to a given token in the search string was sent with the request, this information is used in place of a recomputation of the semantics. For example, if the search string is "authors livingIn Baltimore," the search request would contain the graph pattern (authors:Class,livingIn:Property,Baltimore:Literal:City), which would direct the Query Builder module 175 in building the optimized query. The Query Builder module 175 also builds the query so that the results will be filtered and ordered by rankings that were produced by the Data Rank Builder module 145 described above.

Once the query is built, the Query Ranker/Relaxer module 180 adjusts the query so that if the Query Builder query is too precise (i.e., yielding too few results), the newly "relaxed" query will return more results. However, more results are not always desired. For this reason, the query still takes into account the "relevance and rank" of the data as computed by the Data Rank Builder module 145. The degree of relaxation in the query is determined by assessing the skewing and distribution statistics as calculated by the Data Statistics Builder module 140. For example, for the search string "authors livingIn Baltimore," the Query Relaxer may relax "Authors" to a more general class, such as, for example, "Writers." Alternatively, the Query Relaxer module 180 may relax the query across related terms in the class taxonomy to include "Bloggers" or "NewspaperJournalists" in addition to "Authors." The Query Relaxer module 180 may also relax the geographic term "Baltimore" spatially, thereby including suburbs located nearby to Baltimore. These decisions are all guided by the generated statistics. If the data suggests that a match is unlikely, the Query Relaxer module 180 may drastically relax the query. In a worst-case scenario, a traditional information retrieval (IR)-based keyword search. Accordingly, the Query Relaxer module 180 effectively increases recall in the system.

The Query Ranker module 180 analyzes different permutations of the original and relaxed queries to assess what questions, albeit less precise, have the most relevance. For instance, for the search "authors livingIn Baltimore", it is unlikely that relaxing the query to "persons livingIn Baltimore" would have any relevance to the user. Query ranking entails ranking the relevance of various graph path combinations that constitute a search request. Query ranking can be performed by analyzing previous graph paths from previous search requests, or by utilizing domain—specific knowledge of query patterns. In this manner, the Query Ranker module 180 effectively increases the relevance of the potentially less precise results.

In the next step of the runtime process, the Native Query Executor module 185 executes the query against the underlying graph store and returns results. Each returned result is assigned a data rank which is based on the content of the corpus item corresponding to that result, and the data ranks are stored in a Data Rank Index module 188. The Knowledge Ranker module 190 sifts through the results returned from the query and populates a result set that is based on an aggregation metric of query rank and data rank. For instance, in the query "authors livingIn Baltimore", the Knowledge Ranker module 190 may interweave "Authors living in Baltimore" that have a high query rank with an extremely popular "Blogger who lives in Baltimore" who has a very high data rank.

The Results Transformer module 195 performs any "command" that may be present in the search request. For example, in the search request "Map hotels in New York City," the term "Map" is a command that is present in the search request. Accordingly, the search results can be transformed into a geographic data representation which will provide a map to the user interface. More generally, the Results Transformer module 195 transforms the internal result set data format into the format specified in the search request. Lastly, the Query Manager module 170 returns the search results to the calling client.

Figure 2A:
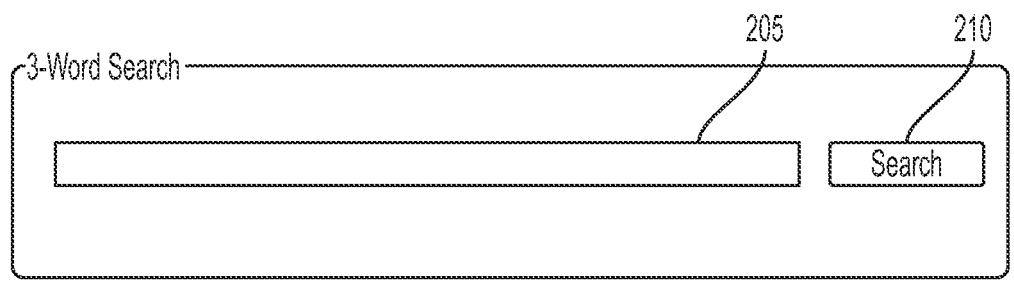
FIGS. 2A-2G are screenshots illustrating user interface aspects of the invention.
Figure 2B:
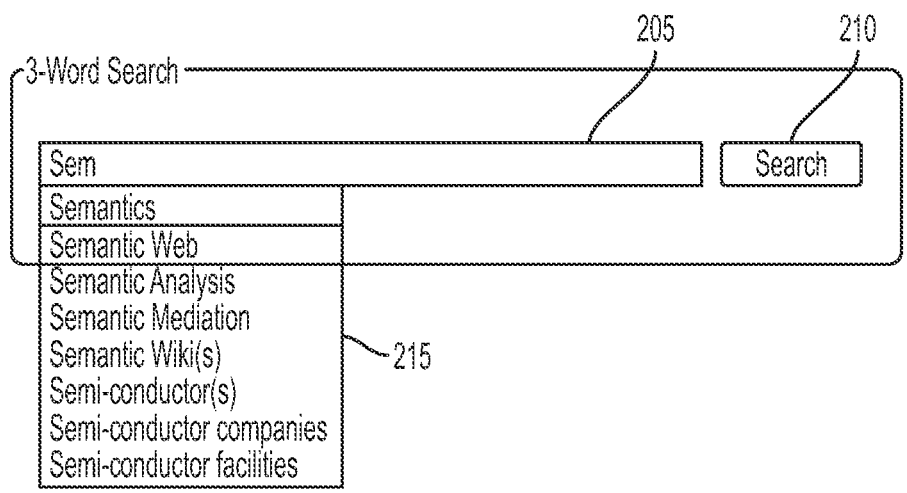
Figure 2C:
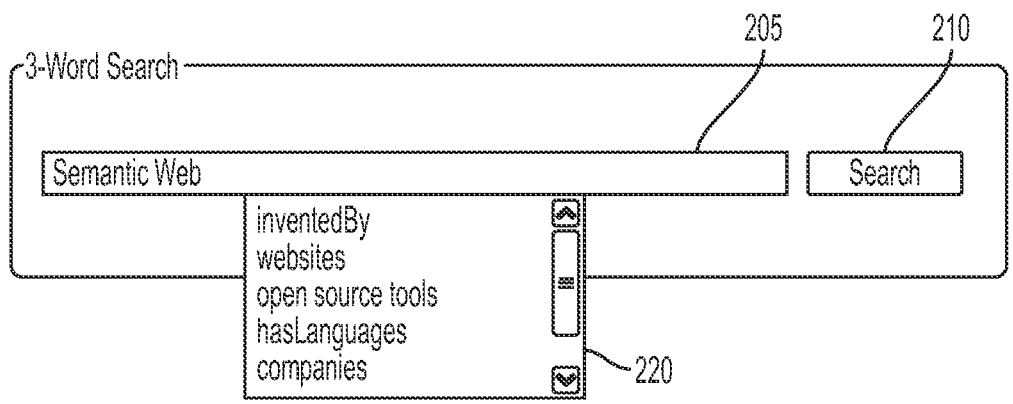
Figure 2D:
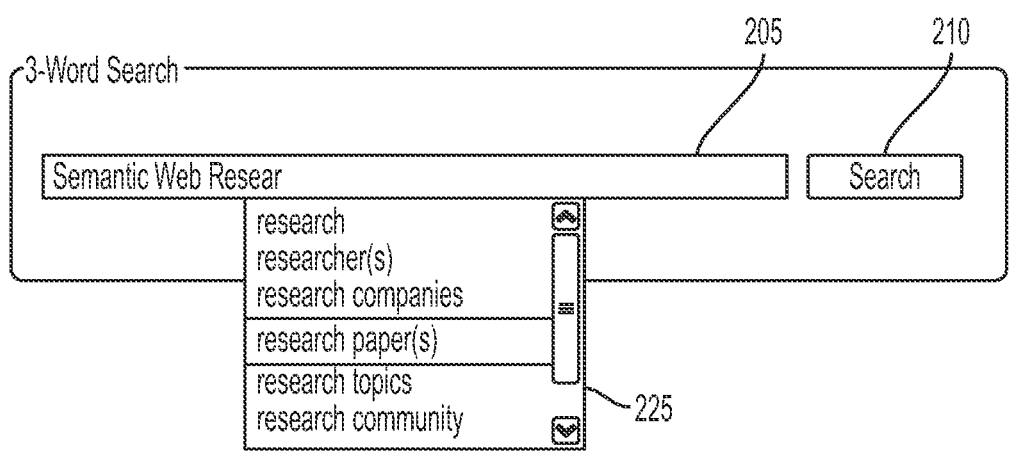
Figure 2E:
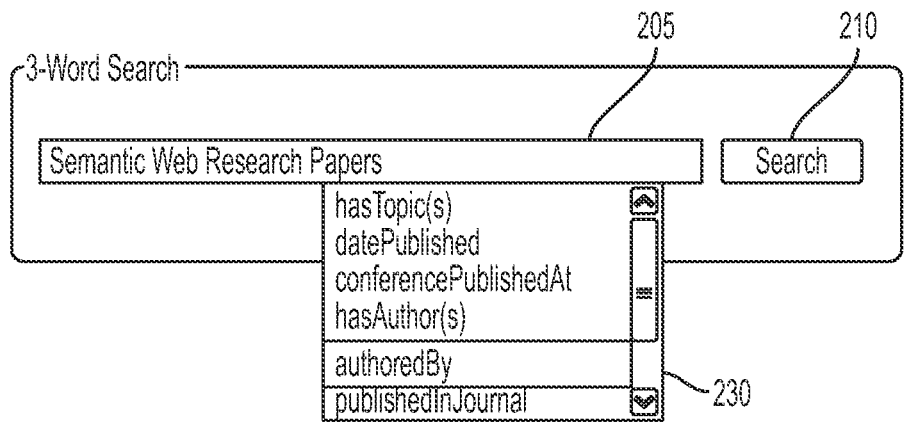
Figure 2F:
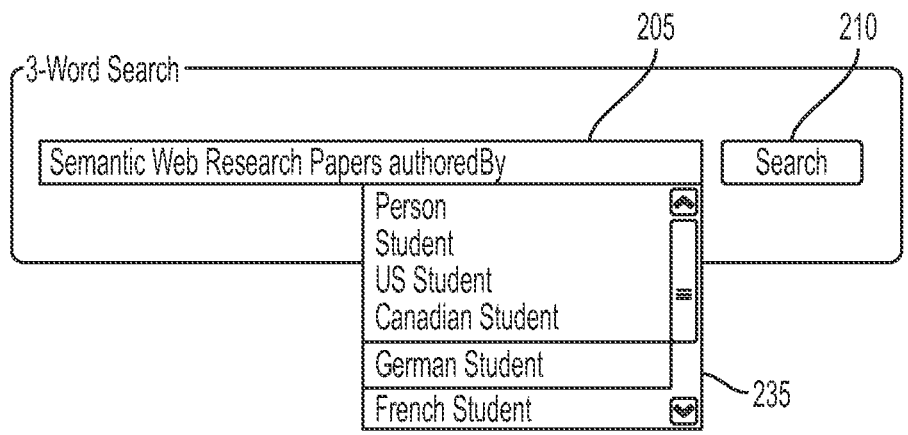
Figure 2G:
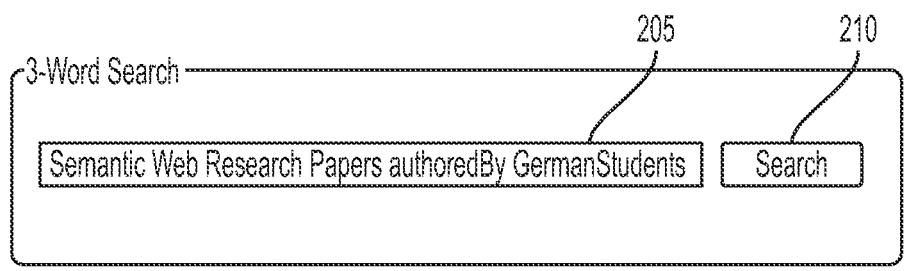

Referring to FIGS. 2A-2G, a series of screen shots illustrates an exemplary user interface process for building a search query in accordance with a preferred embodiment of the present invention. As shown in FIG. 2A, the user begins with a blank search box 205, with a "Search" button 210 also displayed. Referring to FIG. 2B, the user begins typing a first query input representing a desired search term (e.g., "Semantic Web") into the box, and the auto-suggest AJAX capability provides a pop-up list 215 of potential search terms. The user then selects the term "Semantic Web." Referring to FIG. 2C, the user then presses the space bar, which input triggers another pop-up list 220 of the set of known relationships pertaining to the term "Semantic Web," including "inventedBy," "websites," "open source tools," "hasLanguages," and "companies." However, the user does not select any term from this list, because the desired term is unavailable. Therefore, referring to FIG. 2D, the user instead begins typing a second query input representing a desired second search term (e.g., "Research Papers") into the box 205, thereby triggering another pop-up list 225, and enabling the user to select the desired term. Referring now to FIG. 2E, the user then presses space bar, which triggers yet another pop-up list 230 of the set of known relationships pertaining to the term "Research Papers." This time, the user desires the term "authoredBy" and selects this term. Referring now to FIG. 2F, the user presses space bar once again, and terms pertaining to the "authored By" relation appear in another pop-up list 235. The user selects the term "German Student." Referring now to FIG. 2G, the building of the search query is complete. Accordingly, the user clicks on the "Search" button 210 and the search request is sent to the server for execution.

In a preferred embodiment, the present invention provides a method that includes three generalized algorithms. The preprocessing algorithm includes: 1) input of graph data (e.g., RDF); 2) performance of customizable ranking logic with respect to the graph; 3) calculation of distribution and skewing of terms over the graph; 4) vocabulary extraction; 5) application of equivalent class/property/instance model alignment and mapping; 6) application of other model alignment inferencing; 7) application of reverse stemming, lemmatization, and other technique to render properties and classes more conceptual and readable; 8) determination of common join patterns in the graph and pre-computation of any needed materialized joins; 9) indexation of string literals, property names, class names, and graph node identifiers such as Uniform Resource Indicators (URIs); and 10) loading of the graph into the database.

Figure 3:
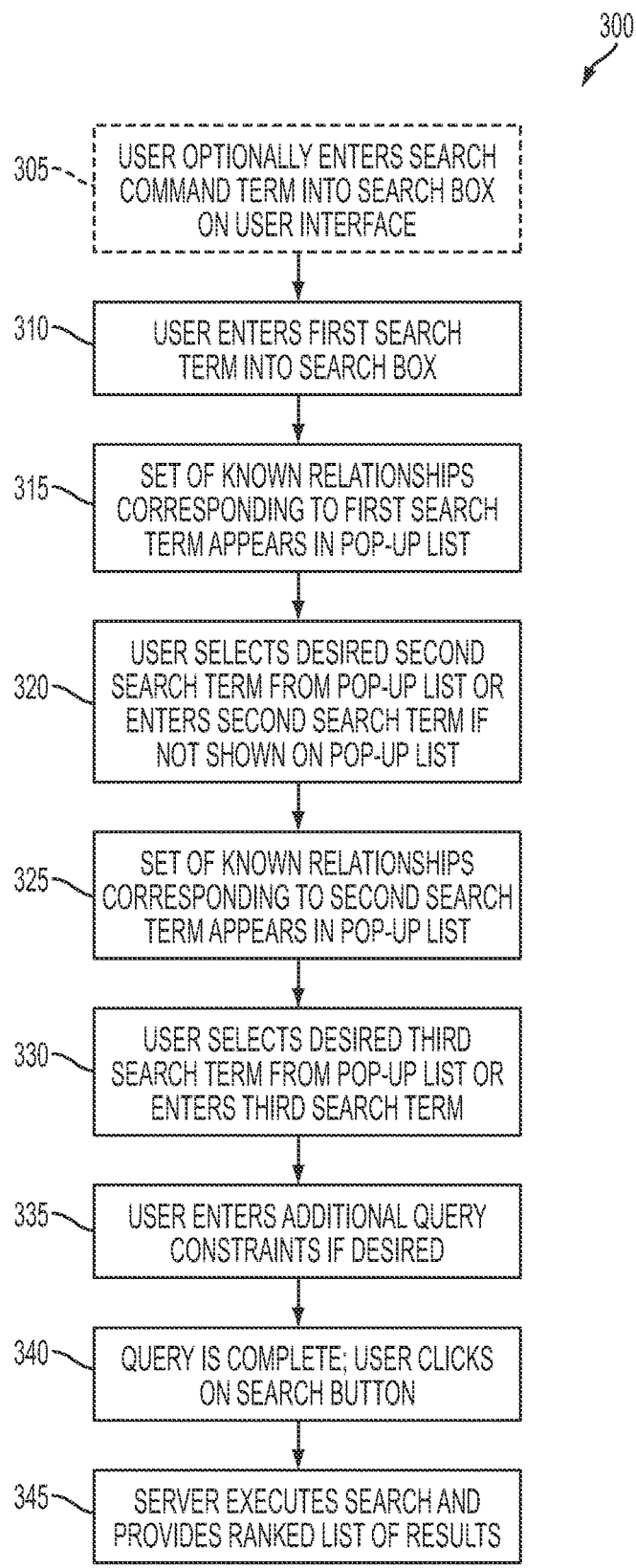
FIG. 3 is a flow chart illustrating a user interface process for performing a search in accordance with an embodiment of the invention.

Referring to FIG. 3, a flow chart 300 illustrates a user interface algorithm according to a preferred embodiment of the invention. The user begins by determining a natural language question to be asked. For example, the user may wish to make the following request: "Display all images that contain persons named Bob where the photographer is John." In step 305, which is optional, the user may begin by typing a command term of a request into the search box on the user interface, and a set of customizable commands is displayed to the user in a list format. In a preferred embodiment, the commands default to "FIND," but could also include terms such as "DISPLAY," "MAP,", "SHOW_CALENDAR," "FIND_AVERAGE," "FIND_MINIMUM," etc. For the present example, the user may wish to visualize the images, so the "DISPLAY" command may be chosen by the user.

In step 310 of the user interface algorithm, the user continues (or alternatively, begins) to build the search query by typing in a first search term. The auto-suggest tool looks up matching class types, properties, names, or literals.

The user then selects a search term, such as, for example, "Images." In step 315, the pressing of the space bar to indicate a separation between terms triggers the auto-suggest tool to list known relationships corresponding to the selected search term. For example, for the term "Images," the auto-suggest tool may list the following: "ImageType," "photographer," "ImageDate," "containing," "contains."

In step 320, the user selects a second search term, such as, for example, "containing." The auto-suggest tool knows the range of the property "containing" and, in step 325, offers class types and names of persons, places, etc. as suggestions for a third search term. Accordingly, in step 330, the user selects a third search term from the list provided, or enters the term manually. In this example, the user may directly select the name "Bob" from the list.

A simple three-term relationship query has now been assembled. In step 335, the user can specify further constraints on the query if desired. Continuing with the present example, if the user presses the space bar and types the letters "p-h-o-t-o," the auto-suggest tool offers properties such as "photographedBy," "imageType," "photographer," etc., and the user may select "photographer" as a further query constraint. Then, when the user presses the space bar, the system looks up literals attached to the "photographer" property. The user may then select "John."

In step 340, the user presses the "Search" button on the form, thereby submitting the query and the term metadata to the server for processing. At step 345, the server executes the search and provides a ranked list of search results to the user interface.

Figure 4:
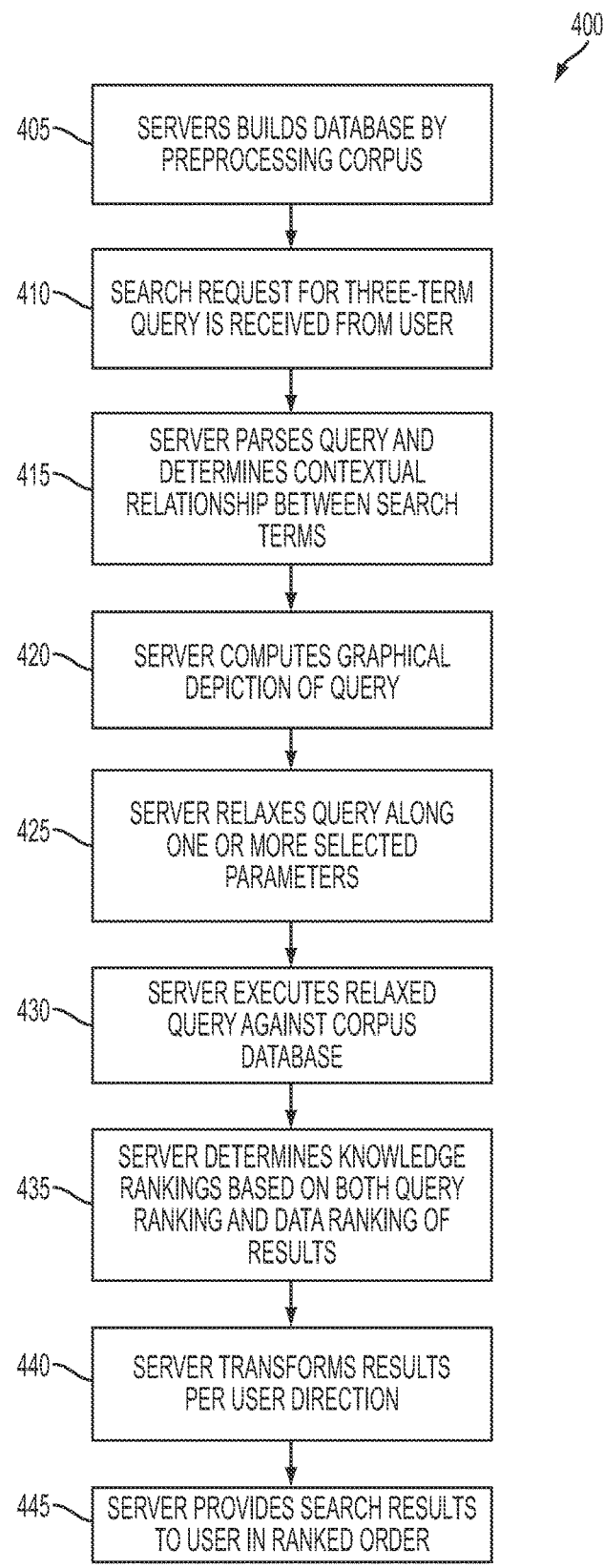
FIG. 4 is a flow chart illustrating a server node process for performing a search in accordance with an embodiment of the invention.

Referring now to FIG. 4, a flow chart 400 illustrates a server node search process according to a preferred embodiment of the present invention. In the first step 405 of the server node search process, the server builds the search repository database by preprocessing the corpus of documents and data items as described above regarding the preprocessing algorithm. Then, at step 410, the server receives the concise search term string and the term metadata from the user interface (i.e., step 340 of the user interface process) and forwards it to a query planner module.

In step 415, the query planner module parses the search string and identifies any command, names, classes, properties, and data sources, and produces a graphical depiction of the query in step 420. If the user requested any terms suggested by the auto-suggest tool, then the term metadata can be used. Otherwise, an advanced parser applies a best guess query to produce a graph pattern to apply against the database.

In step 425, the query planner module relaxes the query along one or more selected parameters. The parameters may include class, property type, or any range. Based on the query relaxation, the query planner derives and ranks a set of expressive "questions" that can be applied against the returned results. For example, if the original query "cheap hotels near downtown Baltimore" is submitted, the response can offer multiple suggestions. A range of values for "cheap hotels" can be ranked and listed, and the proximity to downtown Baltimore can also be included in the ranking. In this way, the server can provide the most exact answers first and then gracefully degrade into less expressive and more inexact answers.

In step 430, the server executes the relaxed query against the database. If no results are returned, a simple keyword search over the terms is performed, in order to obtain results. Then, at step 435, the server determines a knowledge ranking of each result, based on both a data ranking for the respective corpus item and a query ranking of the relevancy of the question with respect to a given domain.

In step 440, if any customized command was listed in the search term, such as "average" or "minimum," the server applies the calculation or transformation to the returned results. Then, in step 445, the search results are actually displayed to the user on the user interface, in ranked order according to the knowledge ranking.

While various embodiments of the present invention have been described above, it should be understood that they have been presented by way of example only, and not limitation. Thus, the breadth and scope of the present invention should not be limited by any of the above-described exemplary embodiments.

The invention claimed is:

1. A system for searching through a corpus by using a query, the corpus comprising a plurality of items, and the system comprising:
   a first computer hosting a server node, the first computer comprising a processor and a non-transitory memory to store instructions; and
   a second computer hosting a user interface node in communication with the first computer, wherein the second computer is configured to receive a first query input and to transmit the first query input to the first computer;
   wherein the processor executes the instructions to:
      use the received first query input to determine a first search term corresponding to a subject of the query and to prompt a user for entry of a second query input after receiving the first query input, by causing first known relationships corresponding to the first search term to be listed, wherein the subject corresponds to a class type, property, name, or literal that matches the first query input;
      use the received second query input to determine a second search term corresponding to a predicate of the query and to prompt the user for entry of a third query input, after receiving the second query input, by causing second known relationships corresponding to the second search term to be listed, wherein the predicate is one of the first known relationships corresponding to the first search term;
      use the received third query input to determine a third search term corresponding to an object of the query, wherein the object corresponds to a class type, person, or location within a range of the second search term;
      use the first, second, and third search terms to determine a contextual relationship therebetween; and
      use the query formed by the first, second, and third search terms and the determined contextual relationship to perform a first comparison against the corpus to determine a ranked list of results.

2. The system of claim 1, wherein the corpus comprises one or more graph-based datasets and the processor further executes the instructions to determine a graphical depiction of the query formed by the first, second, and third search terms, the graphical depiction being based on at least one parameter relating to the determined contextual relationship; and to determine the ranked list of results based on a measure relating to the at least one parameter.

3. The system of claim 2, wherein the processor further executes the instructions to:
   modify the query with respect to the at least one parameter, and
   use the modified query to determine a modified ranked list of results.

4. The system of claim 1, wherein the processor further executes the instructions to use the query and the determined contextual relationship to determine a data ranking score for each item contained in the corpus.

5. The system of claim 4, wherein the processor further executes the instructions to:
   use the query to determine a query ranking score;
   use the query ranking score and the data ranking score to determine a knowledge ranking score; and
   use the knowledge ranking score to determine the ranked list of results.

6. The system of claim 1, wherein the processor further executes the instructions to:
   determine at least one suggested alternative search term to at least one of the first, second, and third search terms;
   transmit the at least one suggested alternative search term to the user interface node;
   receive an acceptance of the at least one suggested alternative search term from the user interface node;
   use the accepted alternative search term to determine a modified contextual relationship between the search terms and to form a modified query; and
   use the modified query and the modified contextual relationship to perform a second comparison against the corpus to determine a modified list of results.

7. A computer program product comprising a non-transitory computer readable medium storing computer readable program code for searching through a corpus by using a query, the computer readable program code comprising a set of instructions, the set of instructions executed by a processor to:

receive a first query input from a user;

use the received first query input to determine a first search term corresponding to a subject of the query, wherein the subject corresponds to a class type, property, name, or literal that matches the first query input;

prompt the user for entry of a second query input, after receiving the first query input, by causing first known relationships corresponding to the first search term to be listed;

receive the second query input from the user;

use the received second query input to determine a second search term corresponding to a predicate of the query, wherein the predicate is one of the first known relationships corresponding to the first search term;

prompt the user for entry of a third query input, after receiving the second query input, by causing second known relationships corresponding to the second search term to be listed;

receive a third query input from the user;

use the received third query input to determine a third search term corresponding to an object of the query, wherein the object corresponds to a class type, person, or location within a range of the second search term;

use the first, second, and third search terms to determine a contextual relationship therebetween; and use the query formed by the first, second, and third search terms and the determined contextual relationship to perform a first comparison against the corpus to determine a ranked list of results.

8. The computer program product of claim 7, wherein the corpus comprises one or more graph-based datasets and the set of instructions further executed by the processor to:

determine a graphical depiction of the query formed by the first, second, and third search terms, the graphical depiction being based on at least one parameter relating to the determined contextual relationship; and determine the ranked list of results based on a measure relating to the at least one parameter.

9. The computer program product of claim 8, wherein the set of instructions further executed by the processor to:

modify the query with respect to the at least one parameter, and use the modified query to determine a modified ranked list of results.

10. The computer program product of claim 7, wherein the set of instructions further executed by the processor to use the query and the determined contextual relationship to determine a data ranking score for each item contained in the corpus.

11. The computer program product of claim 10, wherein the set of instructions further executed by the processor to:

use the query to determine a query ranking score;

use the query ranking score and the data ranking score to determine a knowledge ranking score; and determine the ranked list of results based on the knowledge ranking score.

12. The computer program product of claim 7, wherein the set of instructions further executed by the processor to:

provide at least one suggested alternative search term to at least one of the first, second, and third search terms;

receive an acceptance of the at least one suggested alternative search term;

use the accepted alternative search term to determine a modified contextual relationship between the search terms and to form a modified query; and use the modified query and the modified contextual relationship to perform a second comparison against the corpus to determine a modified list of results.

13. A computer-implemented method for searching through a corpus by using a query, the corpus comprising a plurality of items, and the method comprising:

using a computer to receive a first query input from a user;

using the received first query input to determine a first search term corresponding to a subject of the query, wherein the subject corresponds to a class type, property, name, or literal that matches the first query input;

using the computer to prompt the user for entry of a second query input, after receiving the first query input, by causing first known relationships corresponding to the first search term to be listed;

using the computer to receive the second query input from the user;

using the received second query input to determine a second search term corresponding to a predicate of the query, wherein the predicate is one of the first known relationships corresponding to the first search term;

using the computer to prompt the user for entry of a third query input, after receiving the second query input, by causing second known relationships corresponding to the second search term to be listed;

using the computer to receive the third query input from the user;

using the received third query input to determine a third search term corresponding to an object of the query, wherein the object corresponds to a class type, person, or location within a range of the second search term;

using the first, second, and third search terms to determine a contextual relationship therebetween; and using the query formed by the first, second, and third search terms and the determined contextual relationship to perform a first comparison against the corpus to determine a ranked list of results.

14. The method of claim 13, wherein the corpus comprises one or more graph-based datasets and the determination of a contextual relationship comprises using the computer to determine a graphical depiction of the query formed by the first, second, and third search terms, the graphical depiction being based on at least one parameter relating to the determined contextual relationship; and wherein the determination of a ranked list of results is based on a measure relating to the at least one parameter.

15. The method of claim 14, further comprising the steps of:

using the computer to modify the query with respect to the at least one parameter, and using the modified query to determine a modified ranked list of results.

16. The method of claim 13, wherein the step of using the query and the determined contextual relationship to perform a first comparison against the corpus comprises using the computer to determine a data ranking score for each item contained in the corpus.

17. The method of claim 16, further comprising the steps of:

using the query to determine a query ranking score, and using the query ranking score and the data ranking score to determine a knowledge ranking score, wherein the determination of a ranked list of results is based on the knowledge ranking score.

18. The method of claim 13, further comprising the steps of:
- using the computer to provide at least one suggested alternative search term to at least one of the first, second, and third search terms;
- using the computer to receive an acceptance of the at least one suggested alternative search term;
- using the accepted alternative search term to determine a modified contextual relationship between the search terms and to form a modified query; and
- using the modified query and the modified contextual relationship to perform a second comparison against the corpus to determine a modified list of results.

19. A system for searching through a corpus by using a query, the corpus comprising a plurality of items, and the system comprising:
- a first computer hosting a server node, the first computer comprising a processor and a non-transitory memory to store instructions, wherein the processor executes the instructions to:
- use a received first query input to determine a first search term corresponding to a subject of the query and to prompt the user for entry of a second query input, after receiving the first query input, by causing first known relationships corresponding to the first search term to be listed, wherein the subject corresponds to a class type, property, name, or literal that matches the first query input;
- use the received second query input to determine a second search term corresponding to a predicate of the query and to prompt the user for entry of a third query input, after receiving the second query input, by causing second known relationships corresponding to the second search term to be listed, wherein the predicate is one of the first known relationships corresponding to the first search term;
- use the received third query input to determine a third search term corresponding to an object of the query, wherein the object corresponds to a class type, person, or location within a range of the second search term;
- use the first, second, and third search terms to determine a contextual relationship therebetween; and
- use the query formed by the first, second, and third search terms and the determined contextual relationship to perform a first comparison against the corpus to determine a ranked list of results.

\* \* \* \* \*